US011494939B2

(12) United States Patent
Kehl (10) Patent No.: US 11,494,939 B2
(45) Date of Patent: Nov. 8, 2022

(54) SENSOR SELF-CALIBRATION IN THE WILD BY COUPLING OBJECT DETECTION AND ANALYSIS-BY-SYNTHESIS

(71) Applicant: Toyota Research Institute, Inc., Los Altos, CA (US)

(72) Inventor: Wadim Kehl, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 34 days.

(21) Appl. No.: 16/700,603

(22) Filed: Dec. 2, 2019

(65) Prior Publication Data

US 2021/0166428 A1 Jun. 3, 2021

(51) Int. Cl.
| | |
|---|---|
| *G06T 7/60* | (2017.01) |
| *G06T 7/00* | (2017.01) |
| *H04N 5/247* | (2006.01) |
| *G06T 7/80* | (2017.01) |

(52) U.S. Cl.
CPC .................. *G06T 7/80* (2017.01); *G06T 7/97* (2017.01); *H04N 5/247* (2013.01)

(58) Field of Classification Search
None
See application file for complete search history.

(56) References Cited

U.S. PATENT DOCUMENTS

| | | | |
|---|---|---|---|
| 10,145,945 B2 | 12/2018 | Harada | |
| 10,482,625 B1* | 11/2019 | Adam | .................... H04N 17/02 |
| 11,069,084 B2* | 7/2021 | Chen | .................. G06K 9/00624 |
| 11,257,132 B1* | 2/2022 | Cornelison | ............ G06Q 10/20 |
| 2015/0348320 A1* | 12/2015 | Pesach | ................. A61C 19/043 |
| | | | 382/128 |

(Continued)

FOREIGN PATENT DOCUMENTS

| | | |
|---|---|---|
| CN | 109343061 A | 2/2019 |
| DE | 102016117500 A1 | 3/2018 |

(Continued)

OTHER PUBLICATIONS

Persic, Juraj, "Calibration of Heterogeneous Sensor Systems," https://arxiv.org/pdf/1812.11445.pdf; Published: Dec. 29, 2018.

(Continued)

*Primary Examiner* — Edemio Navas, Jr.
(74) *Attorney, Agent, or Firm* — Dinsmore & Shohl LLP (57) ABSTRACT

A system for self-calibrating sensors includes an electronic control unit, a first image sensor and a second image sensor communicatively coupled to the electronic control unit. The electronic control unit is configured to obtain a first image and a second image, where the first image and the second image contain an overlapping portion, determine an identity of an object present within the overlapping portion, obtain parameters of the identified object, determine a miscalibration of the first image sensor or the second image sensor based on a comparison of the identified object in the overlapping portions and the parameters of the identified object, in response to determining a miscalibration of the first image sensor or the second image sensor, calibrate the first image sensor or the second image sensor based on the parameters of the identified object and the second image or the first image, respectively.

15 Claims, 6 Drawing Sheets

(56) References Cited

U.S. PATENT DOCUMENTS

| | | |
|---|---|---|
| 2018/0189532 A1 | 7/2018 | Bataller et al. |
| 2019/0073545 A1 | 3/2019 | Dolgov et al. |
| 2019/0287136 A1* | 9/2019 | Catalano ............ G06Q 30/0261 |
| 2020/0005489 A1* | 1/2020 | Kroeger ............... G06K 9/4604 |

FOREIGN PATENT DOCUMENTS

| | | |
|---|---|---|
| DE | 102016223290 A1 | 5/2018 |
| KR | 20180112623 A | 10/2018 |
| WO | 2017080715 A1 | 5/2017 |

OTHER PUBLICATIONS

Zhang, Zhengyou, "A Flexible New Technique for Camera Calibration," IEEE Trans. Pattern Anal. Mach. Intell. 22 (2000): pp. 1330-1334.

Brouwers, Guido M.Y.E. et al., "Automatic Calibration of Stationary Surveillance Cameras in the Wild," ECCV Workshops (2016).

Dubska, Marketa et al., "Automatic Camera Calibration for Traffic Understanding," BMVC (2014).

Pandey, Gaurav et al., "Automatic Camera Targetless Extrinsic Calibration of a 3D Lidar and Camera by Maximizing Mutual Information," https://www.aaai.org/ocs/index.php/AAAI/AAAI12/paper/viewFile/5029/5371; Published Jul. 2012.

Taylor, Zachary et al., "Automatic calibration of multi-modal sensor systems using a gradient orientation measure," 2013 IEEE/RSJ International Conference on Intelligent Robots and Systems (2013), pp. 1293-1300.

Taylor, Zachary, et al., "Automatic Calibration of Lidar and Camera Images using Normalized Mutual Information" http://www-personal.acfr.usyd.edu.au/jnieto/Publications_files/TaylorICRA2013.pdf; Published Sep. 18, 2012.

Levinson, Jesse, et al., "Automatic Online Calibration of Cameras and Lasers," http://www.roboticsproceedings.org/rss09/p29.pdf, Published Jun. 24, 2013.

* cited by examiner

SENSOR SELF-CALIBRATION IN THE WILD BY COUPLING OBJECT DETECTION AND ANALYSIS-BY-SYNTHESIS

TECHNICAL FIELD

The present specification generally relates to systems and methods for self-calibration of sensors in-the-wild. More specifically, embodiments of the present specification relate to systems and methods for self-calibration of sensors of an electronic device such as a vehicle operating in-the-wild.

BACKGROUND

Apparatuses, such as robots, autonomous vehicles, or the like, include sensors. such as cameras, LIDAR sensors, radar sensors, sonar sensors, or the like, that require calibration from time to time. In particular, calibration of the sensors may be required because vibrations, environmental conditions, or other factors may cause sensors to fall out of calibration. Sensors and sensor systems installed on such apparatuses may be calibrated in a controlled environment with calibration objects having known dimensions. However, when these calibrations are required, it may not be advantageous or possible to seek out a mechanic or calibration facility to complete a controlled environment calibration.

Accordingly, there is a need for systems and methods for self-calibration of sensors on a vehicle in-the-wild.

SUMMARY

In one embodiment, a system includes an electronic control unit, a first image sensor communicatively coupled to the electronic control unit, and a second image sensor communicatively coupled to the electronic control unit. The electronic control unit is configured to obtain a first image comprising a first portion of an environment from the first image sensor, and obtain a second image comprising a second portion of the environment from the second image sensor, where the first image and the second image contain an overlapping portion. The electronic control unit is further configured to localize an object present within the overlapping portion, determine an identity of the object present within the overlapping portion, obtain parameters of the identified object, determine a miscalibration of the first image sensor or the second image sensor based on a comparison of the identified object in the overlapping portions and the parameters of the identified object, in response to determining a miscalibration of the first image sensor, calibrate the first image sensor based on the parameters of the identified object and the second image, and in response to determining a miscalibration of the second image sensor, calibrate the second image sensor based on the parameters of the identified object and the first image.

In some embodiments, a method includes obtaining, with an electronic control unit, a first image comprising a first portion of an environment from a first image sensor, obtaining, with the electronic control unit, a second image comprising a second portion of the environment from a second image sensor, where the first image and the second image contain an overlapping portion of the environment, localizing an object present within the overlapping portion, determining an identity of the object present within the overlapping portion, obtaining parameters of the identified object, determining a miscalibration of the first image sensor or the second image sensor based on a comparison of the identified object in the overlapping portions and the parameters of the identified object, in response to determining a miscalibration of the first image sensor, calibrating the first image sensor based on the parameters of the identified object and the second image, and in response to determining a miscalibration of the second image sensor, calibrating the second image sensor based on the parameters of the identified object and the first image.

In some embodiments, a system includes an electronic control unit, a first image sensor communicatively coupled to the electronic control unit, and a depth sensor communicatively coupled to the electronic control unit. The electronic control unit is configured to obtain a first image comprising a first portion of an environment from the first image sensor, determine an identity of an object present within the first image, obtain parameters of the identified object, receive a depth signal corresponding to a distance from the depth sensor to the identified object, determine a scaling factor to apply to the parameters of the identified image based on the depth signal, scale the parameters based on the scaling factor, determine a miscalibration of the first image sensor based on a comparison of the identified object in the first image and the scaled parameters of the identified object, and in response to determining the miscalibration of the first image sensor, calibrate the first image sensor based on the scaled parameters of the identified object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for self-calibration of sensors on an apparatus, such as a vehicle. Embodiments described herein use sensors of the apparatus itself in order carry out automatic calibration on the fly in any environment. The embodiments described herein automatically calibrate sensors by utilizing an object-centric calibration where the calibration targets are detected in the environment and matched against a database of known objects having known dimensional values. Furthermore, embodiments disclosed herein may include a system and method of utilizing sensor data from two or more sensors to calibrate and/or validate a calibration of one or more of the sensors. In some embodiments, a system and method may include a first sensor, a second sensor, and a computing device. The first sensor (e.g., a camera, a LIDAR sensor, radar, or the like) is configured to capture sensor data of an environment and/or objects within the environment. The second sensor (e.g., a camera, a LIDAR sensor, radar, or the like) having a field of view overlapping at least a portion of a field of view of the first sensor also captures sensor data of the environment and/or objects within the environment. The first and second sensor may be the same type of sensor, for example, both cameras, or may be a combination of different sensors, for example, a LIDAR system and a camera. In some embodiments, the computing device processes the sensor data from the first sensor and the sensor data from the second sensor to determine whether there is a miscalibration of one of the sensors. In the same or other embodiments, the computing device may utilize the sensor data from the first sensor to calibrate the second sensor or update an existing calibration of the second sensor (or vice versa).

In some embodiments, the self-calibration systems and methods may include one or more sensors configured to capture image, video, or other sensor data of the environment. A computing device may then analyze the sensor data of the first and second sensors to determine the presence of one or more objects within the environment that corresponds to known objects in a database having known dimensions. The computing device may utilize these known objects to determine whether one or more of the sensors is correctly calibrated. Moreover, the computing device may utilize the sensor data captured with respect to the known object by the first sensor and project that sensor data into the sensor data of the second sensor to calibrate the second sensor.

A computing device may determine calibration factors, such as intrinsic and extrinsic factors for the sensors, based on distance measurements from sensors, the sensor data pertaining to the known object in the environment, and information about the known object (e.g., dimension, color, etc.) retrieved from a database.

For example, using a dashcam on a first vehicle, other vehicles in front of the first vehicle can be detected. The pose, make, model, and the like of such other vehicles can be determined. The dimensions of such a detected vehicle can be retrieved from a database. An appearance of the detected vehicle can be synthesized from the parameters retrieved from the database. The method can then iteratively optimize the calibration parameters until agreement between the synthesized image and the real appearance captured by the dashcam is achieved.

By way of another example, a robot operating in a household may detect a soda bottle, both through image data from a camera and a depth or distance enabled sensor, such as a LIDAR sensor or sonar sensor. A computing device of the robot can retrieve specific 3D models from the database and synthesize the model, as it would appear to each sensor. Through continuous synthesis and refinement, the alignment between all sensors may be established and calibration values may be determined.

Accordingly, the embodiments disclosed herein include a system and method of utilizing sensor data from two or more sensors to calibrate and/or validate a calibration of one or more of the sensors. The system and method may combine sensor data from two or more sensors and known information about an object in the environment to calibrate and/or determine whether calibration values need to be updated for one or more of the sensors.

Systems and methods for self-calibration of sensors on a vehicle will now be described in more detail herein.

Figure 1:
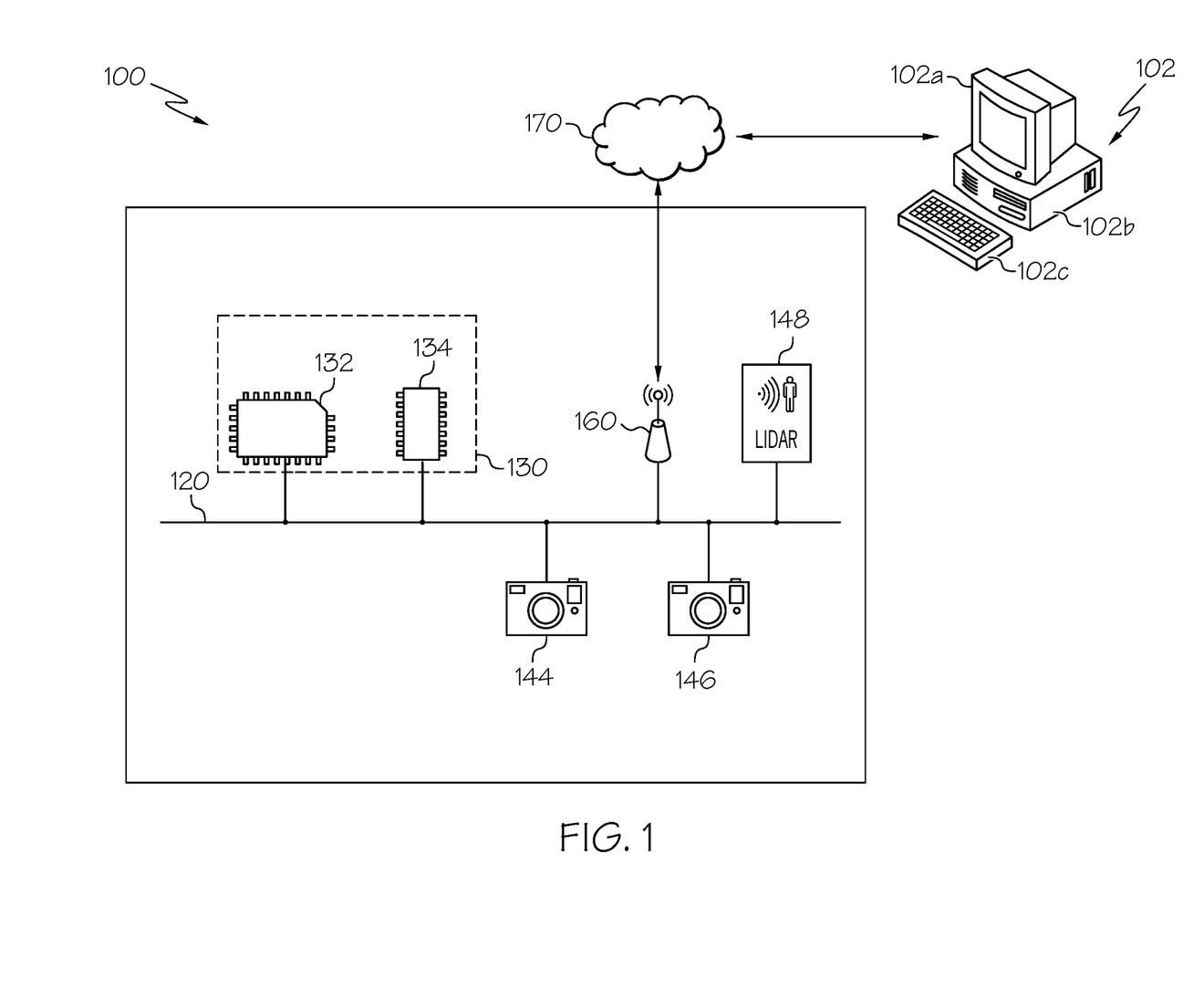
FIG. 1 schematically depicts components of a system for self-calibrating sensors within a vehicle according to one or more embodiments shown and described herein.
Figure 2:
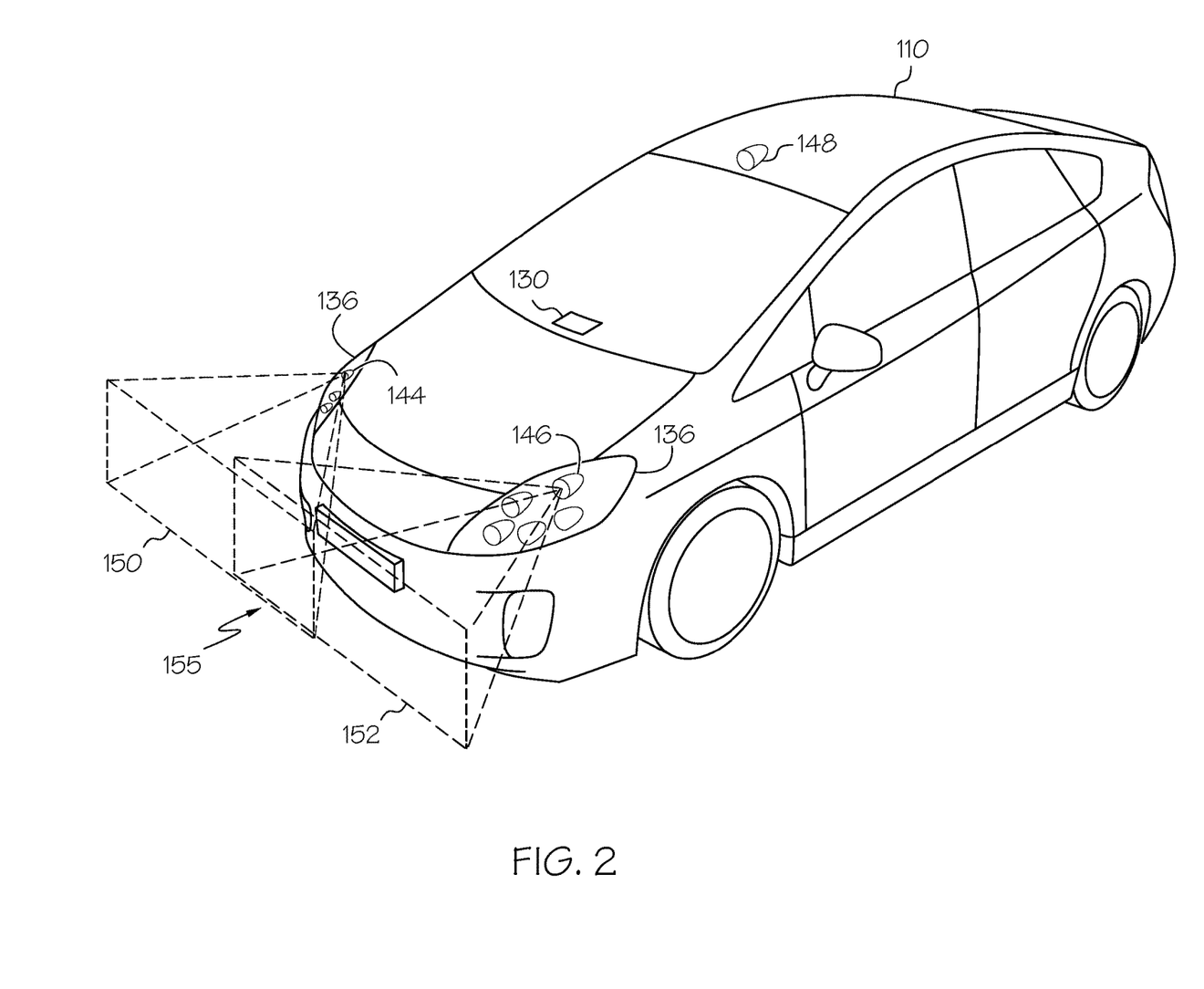
FIG. 2 depicts an illustrative environment and vehicle for self-calibrating sensors within a vehicle according to one or more embodiments shown and described herein.

Turning now to the drawings wherein like numbers refer to like structures, and particularly to FIGS. 1 and 2, FIG. 1 schematically depicts components of a system for self-calibrating sensors in-the-wild. FIG. 2 illustratively depicts an example implementation of the system 100 in a vehicle 110. The embodiments described herein are directed to implementation of the system 100 in a vehicle 110, however, this is merely an example implementation as other electronic devices such as robots, aircraft, other transportation vehicles, security or monitoring systems, mapping systems, or the like may utilize the systems and methods for self-calibration of sensors as disclosed herein.

The system 100 for self-calibrating sensors within a vehicle 110 includes, a communication path 120, an electronic control unit 130 having a processor 132 and a non-transitory computer readable memory 134, one or more cameras 144, 146 (also referred to herein as the first image sensor 144 and the second image sensor 146, one or more depth sensors 148 such as a radar sensor, sonar sensor, LIDAR sensor or the like, and network interface hardware 160. The system 100 may be communicatively coupled to a network 170 by way of the network interface hardware 160. The components of the system 100 are contained within or mounted to a vehicle 110. The various components of the system 100 and the interaction thereof will be described in detail below.

The network 170 may operate to connect the system 100 with one or more computing devices 102. The computing device 102 may include a display 102*a*, a processing unit 102*b* and an input device 102*c*, each of which may be communicatively coupled to together and/or to the network 170. The computing device 102 may be utilized to configure the system 100 and/or provide information such as parameters for objects identified by the system, which will be described in more detail herein.

Referring to the system 100, the communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 of the system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

Still referring to FIGS. 1 and 2, the one or more cameras 144, 146 are coupled to the communication path 120 and communicatively coupled to the electronic control unit 130 and consequently the processor 132 and non-transitory computer readable memory 134. Each of the one or more cameras 144, 146 may be any device having an array of sensing devices (e.g., pixels) capable of detecting radiation in an ultraviolet wavelength band, a visible light wavelength band, or an infrared wavelength band. Each of the one or more cameras 144, 146 may include or be associated with a night vision system or low light system. Each of the one or more cameras 144, 146 may have any resolution; however, high resolution may provide for enhanced light and object identification and detection. Each of the one or more cameras 144, 146 may be an omni-directional camera, or a panoramic camera. In some embodiments, one or more optical components, such as a mirror, fish-eye lens, or any other type of lens may be optically coupled to each of the one or more cameras 144, 146. Each of the one or more cameras 144, 146 may be positioned within or on the vehicle 110 to view the environment external to the vehicle 110. For example, without limitation, each of the one or more cameras 144, 146 may be positioned on the dashboard of the vehicle 110 or within the vehicle headlamp units 136 to capture images of the surroundings in front, alongside, behind, above, or below the vehicle 110 during operation. The position of each of the one or more cameras 144, 146 is not limited to the dashboard or the vehicle headlamp units 136 of the vehicle 110. Each of the one or more cameras 144, 146 may be positioned anywhere on or within the vehicle 110 to capture images of surroundings of the vehicle 110 during operation.

The one or more cameras 144, 146 are implemented to capture images of the surroundings of the vehicle and generate image data that is communicated to the electronic control unit 130 and processor 132. During normal operation, the image data may be received by the processor 132, which process the image data using one or more image recognition, object recognition, and/or other image processing algorithms to enable one or more vehicle systems such as assistive driving or other early warning systems such as cross-traffic alerts or pedestrian alerts. In some embodiments, during calibration of the sensors, the first image sensor 144 captures a first image 150 and the second image sensor 146 captures a second image 152 whereby the first image 150 and the second image 152 include an overlapping portion 155. The overlapping portion 155 is an overlapping field of view of the environment. The overlapping portion 155 may be determined through analysis of the first image 150 and the second image 152 to determine the presence of one or more common objects or features present in each of the first and second image 150, 152. Any known or yet-to-be developed video or image recognition, object recognition, and/or other image processing algorithms may be implemented by the electronic control unit 130 to identify features within the image data of the calibration pattern. Moreover, any known or yet-to-be-developed object recognition algorithms or facial recognition algorithms may be used to extract the objects and features from the image data. Example object recognition algorithms or facial recognition algorithms include, but are not limited to, structure from motion ("SFM"), scale-invariant feature transform ("SIFT"), speeded up robust features ("SURF"), and edge-detection algorithms. The object recognition algorithms or facial recognition algorithms may be stored in the non-transitory computer readable memory 134 and executed by the processor 132.

In some embodiments, the system 100 may include a depth sensor 148. The depth sensor 148 may be any sensor capable of determining a distance from the depth sensor to an object or feature in an environment. The depth sensor 148 may be independent sensor device such as a radar sensor, sonar sensor, LIDAR sensor or the like. The depth sensor 148 may also be configured with the one or more cameras 144, 146, where by IR image data or RGB image data captured by the one or more cameras 144, 146 may be utilized to determine distances within an environment.

Still referring to FIGS. 1 and 2, the system 100 includes network interface hardware 160 coupled to the communication path 120 and communicatively coupled to the electronic control unit 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the system 100 may be communicatively coupled to nearby vehicles via the network 170. In some embodiments, the network 170 is a personal area network that utilizes Bluetooth technology to communicatively couple the system 100 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The following sections will now describe embodiments of the operation of the system 100 for self-calibrating sensors such as the one or more cameras 144, 146 of a vehicle 110 in-the-wild. As used herein, the term "in-the-wild" refers to the operation environments for the vehicle or electronic device which the sensor for calibration is connected and operating within. Additionally, although embodiments disclosed herein refer to systems for automatically calibrating one or more cameras 144, 146, other sensors may also be calibrated using the systems and methods described herein.

FIG. 2 shows an illustrative schematic of a vehicle 110 having the system 100 implement therein for self-calibrating a first image sensor 144 and/or a second image sensor 146. As depicted, for example, but without limitation, the first image sensor 144 and the second image sensor 146 are disposed with respective vehicle headlight units 136. The fields of view of each of the first image sensor 144 and the second image sensor 146 are depicted forming an area of capture defining a first image 150 and a second image 152. Based on the positions and fields of view of each of the first image sensor 144 and the second image sensor 146, an overlapping portion 155 is formed. The overlapping portion 155 is utilized by the electronic control unit 130 to determine whether there is a miscalibration between the first image sensor 144 and the second image sensor 146.

In some embodiments, the system 100 includes a depth sensor 148. As depicted in FIG. 2, the depth sensor 148 is mounted to the roof of the vehicle 110, however, this position is only an example. The depth sensor 148 is configured to determine distances to objects or features in the environment around the vehicle 110. For example, in some embodiments, the depth sensor 148 may determine a distance between the depth sensor and an object within the overlapping portion 155. The determined distance may be translated to the distance from the first image sensor 144 and/or the second image sensor 146 to the identified object in the overlapping portion 155. The translation may be a function of known geometry between the first image sensor 144, the second image sensor 146 and the depth sensor 148 as mounted to the vehicle 110.

Figure 3:
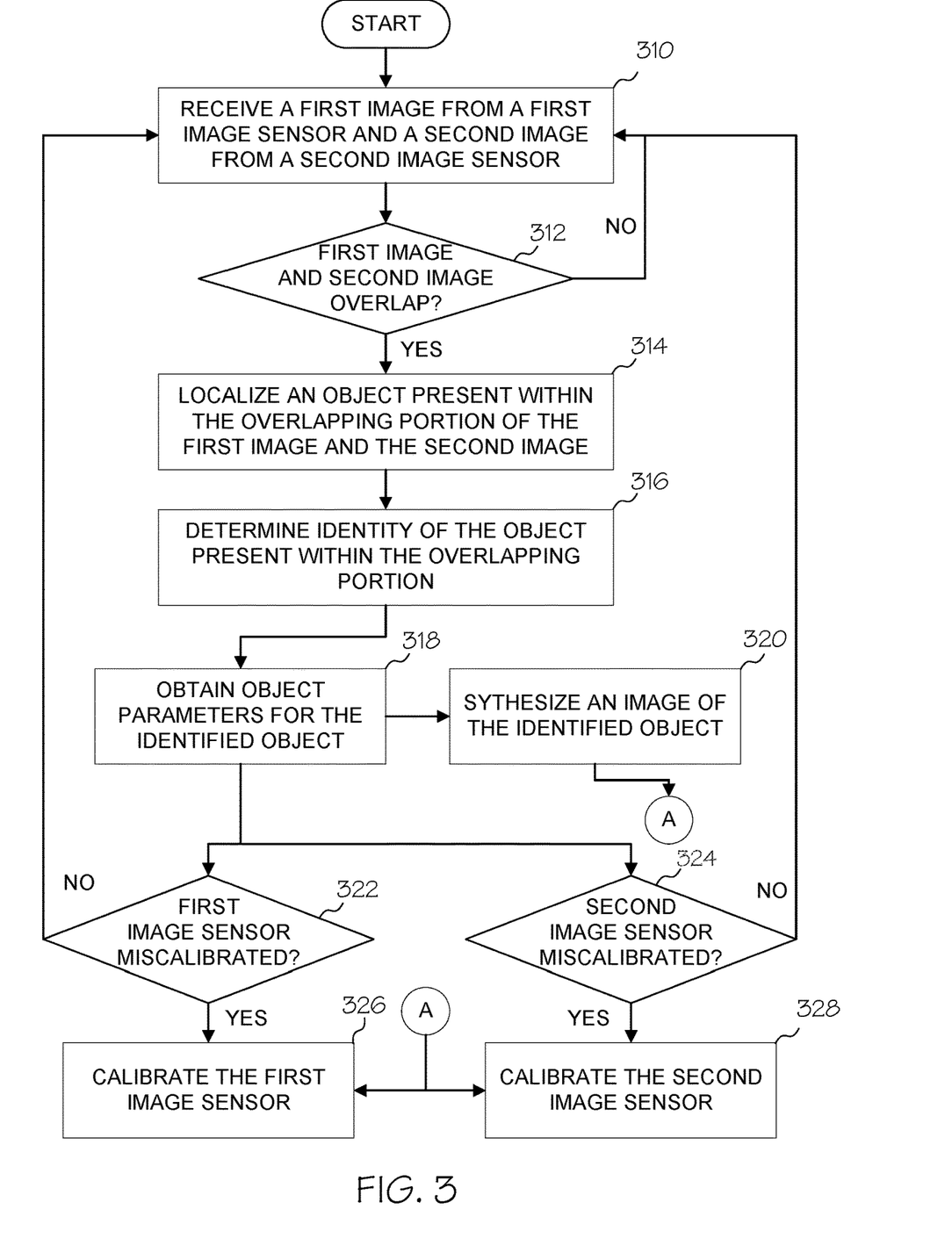
FIG. 3 depicts a flowchart of an example method for automatically calibrating sensors within a vehicle according to one or more embodiments shown and described herein.

Turning to FIG. 3 a flow diagram 300 of an illustrative method for self-calibrating sensors in-the-wild is depicted. The steps depicted in the flow diagram 300 may be implemented by the electronic control unit 130. At block 310 the electronic control unit 130 receives a first image (e.g., 150, FIG. 2) from a first image sensor (e.g., 144, FIGS. 1 and 2) and a second image (e.g., 152, FIG. 2) from a second image sensor (e.g., 146, FIGS. 1 and 2). The first image 150 is an image of a first portion of an environment and the second image is an image of a second portion of the environment. At block 312, the electronic control unit 130 determines whether the first image and the second image contain an overlapping portion of the environment. This may be determined by identifying common features, lines, pixel values, etc. present in both the first image 150 and in the second image 152 in order to register the at least a part of the first image 150 with at least a part of the second image 152. If no overlap between the first image and the second image is able to be determined (NO at block 312), the process returns to block 310. However, if an overlapping portion (e.g., 155, FIG. 2) is determined (YES at block 312), then the process advances to block 314. At block 314, the electronic control unit 130 localizes an object present within the overlapping portion 155 of the first image 150 and the second image 152, such as by determining a location of the object based on the data of the first image 150, the second image 152, and additional information, such as provided by the depth sensor 148. At block 316, an identity of the object is determined. Object recognition algorithms may be implemented to determine the classification and/or identity of the object.

At block 318, once an identity of the object is determined, the electronic control unit 130 obtains parameters for the identified object. In some embodiments, the electronic control unit 130 may also receive a depth signal from a depth sensor (e.g., 148, FIGS. 1 and 2) to determine the distance the object is from the first image sensor 144 and/or the second image sensor 146. The distance may also be obtained through a depth analysis algorithm applied to the first image 150 and/or the second image 152. Information, such as distance to the object, may be utilized by the electronic control unit 130 to scale, for example, by determining a scaling factor, the parameters to correspond to the object being captured in the overlapping portion 155. In some embodiments, at block 320, the electronic control unit may synthesize an artificial image of the identified object based on the parameters and the scaling factor (e.g., together referred to herein as "scaled parameters"). The synthesized image may be a scaled image or model of the object identified in the overlapping portion and may be utilized to determine whether the first image sensor and/or the second image sensor is mis-calibrated.

For example, at blocks 322 and 324 the electronic control unit 130 determines whether a miscalibration of the first image sensor or the second image sensor is present. The determination at blocks 322 and 324 may be based on a comparison of the identified object in the overlapping portions of the first image and the second image and the parameters of the identified object. This determination is described in more detail with reference to FIGS. 4A-4C. In some embodiments, the determination at blocks 322 and 324 may be based on a comparison of the identified object in the overlapping portions of the first image and the second image and the synthesized image of the identified object. The identified object may be a vehicle defined by a make, model, and/or year. In some embodiments, the identified object may be a product such as a soda can or bottle, a road sign, a street lamp, a building with known dimensions, or the like.

While the present disclosure focuses on determining the presence of a common object in the overlapping portion 155 of the first image and the second image, it is contemplated that self-calibration of a first image sensor may be accomplished with the first image from the first image sensor, distance information from a depth sensor 148, and the parameters of the identified object. For example, the electronic control unit 130, may determine an object in the first image 150 and obtain parameters for that object. The parameters may be scaled based on the distance information from the depth sensor 148. The scaled parameters may be compared with the dimensions extracted from the first image of the identified object to determine if any adjustments to the calibration of the first image sensor are required. In some embodiments, the comparison may be a comparison between a synthesized image of the identified object based on the scaled parameters and the identified object within the first image 150.

Referring still to FIG. 3, after block 318, the electronic control unit 130, upon determining a miscalibration in the first image sensor 144, at block 322 and/or a miscalibration in the second image sensor 146, at block 324, may implement calibration algorithms at blocks 326 and/or 328, respectively. Calibration of the first image sensor 144 and/or the second image sensor 146 may include an adjustment to intrinsic and/or extrinsic parameters of the image sensor. For example, extrinsic parameters such as rotation and/or translation parameters of the image captured by the image sensor may be adjusted. Intrinsic parameters such as focal length, the optical center, skew coefficient, magnification, or the like may be adjusted. Other parameters that may be calibrated might include adjustments to color, light sensitivity, distortion (e.g., positive or negative radial distortion or translation distortion), or the like. The calibration values may be determined based on the image sensor that is determined to be in calibration and/or the parameters or synthesized image based on the parameters.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Figure 4A:
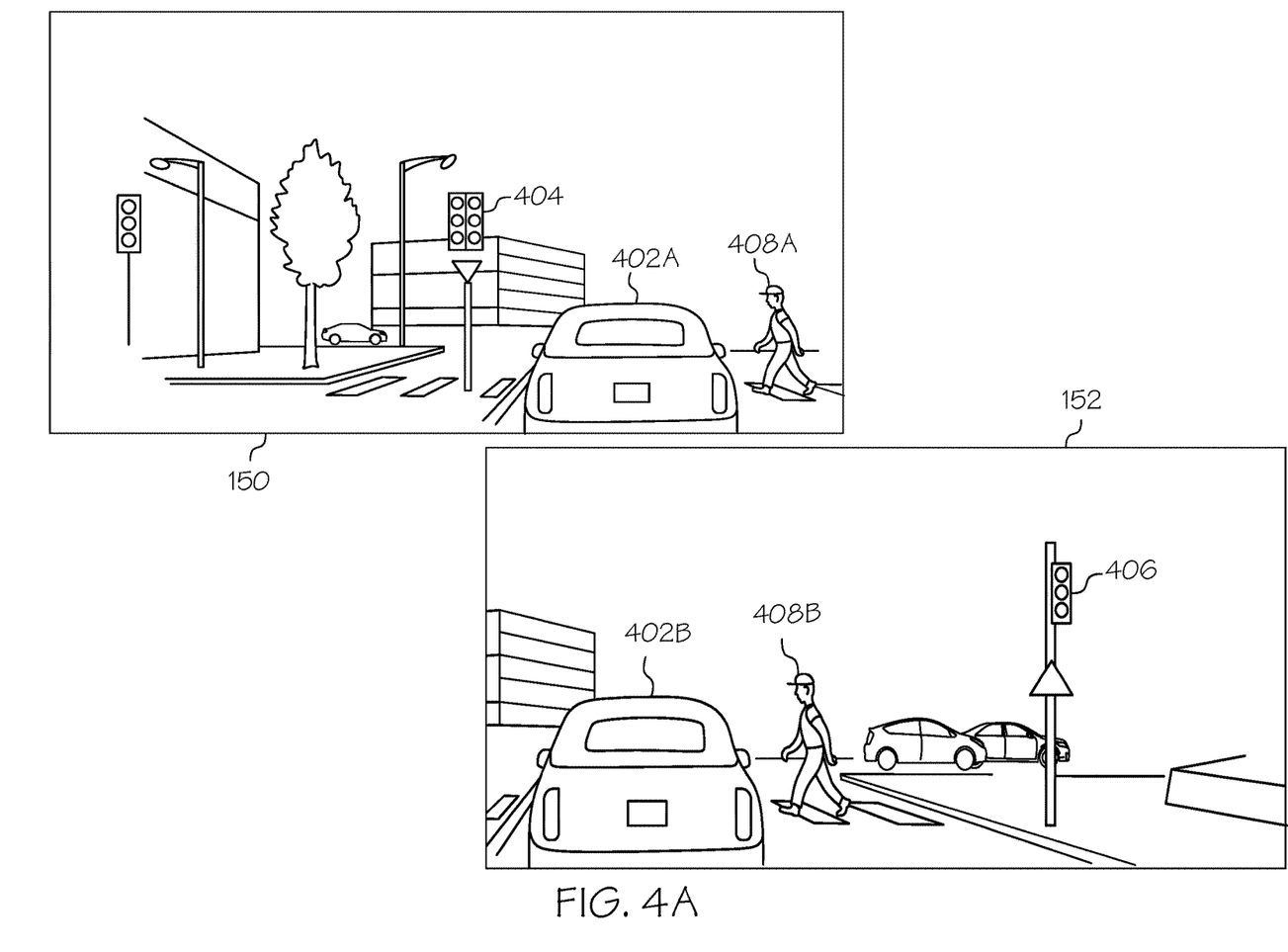
FIG. 4A depicts an illustrative example of the self-calibration process shown and described with respect to example images captured by the image sensors to be calibrated according to one or more embodiments shown and described herein.
Figure 4B:
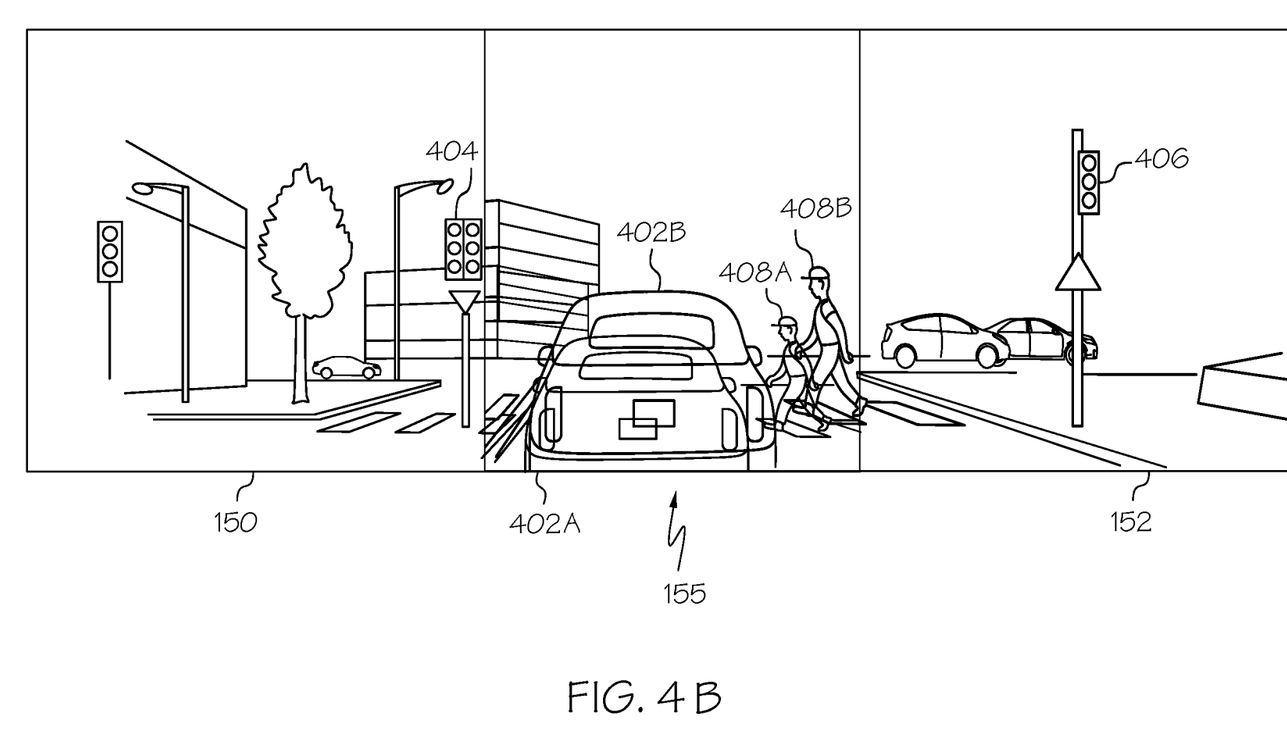
FIG. 4B depicts an illustrative example of the self-calibration process shown and described with respect to example images captured by the image sensors to be calibrated according to one or more embodiments shown and described herein.
Figure 4C:
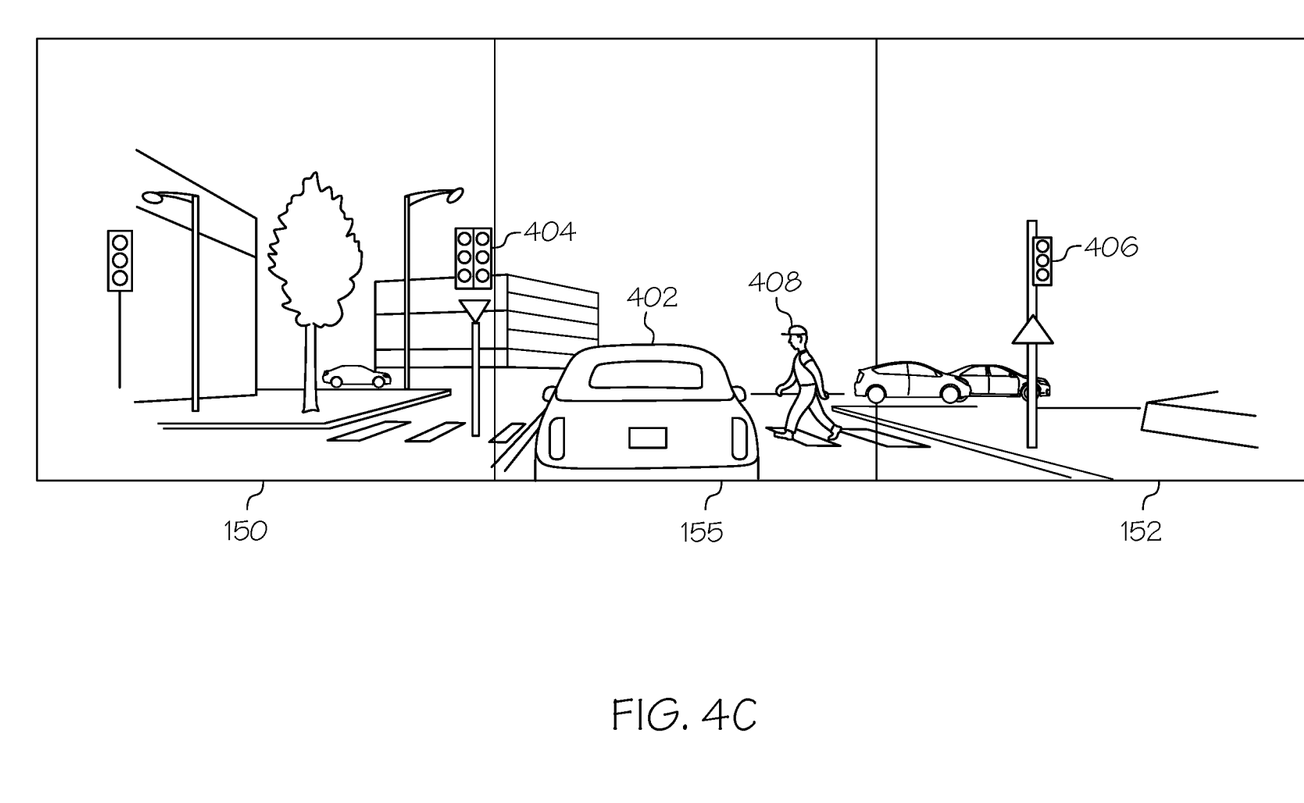
FIG. 4C depicts an illustrative example of the self-calibration process shown and described with respect to example images captured by the image sensors to be calibrated according to one or more embodiments shown and described herein.

Turning to FIGS. 4A-4C, an illustrative example of the self-calibration process describe herein is depicted and described with respect to example images captured by the image sensors to be calibrated. FIG. 4A depicts a first image 150 and a second image 152 captured by the first image sensor 144 and the second image sensor 146, respectively. The environment includes several readily identifiable objects including a vehicle 402 (e.g., vehicle 402A as captured in the first image 150 and vehicle 402B as captured in the second image 152), a first stoplight 404, a second stoplight 406, and a pedestrian 408 (e.g., pedestrian 408A as captured in the first image 150 and pedestrian 408B as captured in the second image 152). The electronic control unit 130 may determine there are common objects in both images and therefore may determine whether there is a common object in an overlapping portion. Turning to FIG. 4B when the first image 150 and the second image 152 are compared, an overlapping portion 155 is determined. Each of the first image sensor 144 and the second image sensor 146 capture the vehicle 402 and the pedestrian 408. However, the pedestrian 408 does not offer any useful information for calibration purposes as the dimensions of a pedestrian 408 vary from person to person and without a positive identification of the person and known parameters it may not be possible to determine whether the first image sensor and/or the second image sensor require calibration. On the other hand, vehicle 402 also resides in the overlapping portion and parameters for the vehicle 402 may be readily ascertained from the vehicle specification.

FIG. 4B further depicts a miscalibration between the first image sensor 144 and the second image sensor 146. For example, the vehicle 402A as captured by the first image sensor 144 in the first image 150 appears smaller and possibly translated with respect to the vehicle 402B as captured by the second image sensor 146 in the second image 152. The electronic control unit 130, as described in blocks 318-324 of FIG. 3, may determine the scaled parameters for the vehicle 402 and determine whether there is a miscalibration of the first image sensor 144 or the second image sensor 146 based on a comparison of the identified object in the overlapping portions of the first image 150 and the second image 152 and the parameters of the identified object. For purposes of the present example, it is determined that the second image sensor 146 has a magnification calibration value that is greater than the first image sensor 144. Therefore, the electronic control unit 130, for example executing block 328 of FIG. 3, may iteratively adjust the magnification value and/or other calibration values until a seamless overlapping portion 155 is achieved as depicted in FIG. 4C.

Once calibration of the image sensors is complete, for example, when the positions, angles, and/or other intrinsic or extrinsics values of the image sensors are determined they may be stored in the one or more cameras 144, 146 or the memory component 134 of the electronic control unit for use during operation.

It should now be understood that embodiments described herein are directed to systems and methods for self-calibration of sensors on an apparatus such as a vehicle. Embodiments described herein use sensors of the apparatus itself in order carry out automatic calibration on the fly in any environment. The embodiments described herein automatically calibrate sensors by utilizing an object-centric calibration where the calibration targets are detected in the environment and matched against a database of known objects having known dimensional values. Furthermore, embodiments disclosed herein may include a system and method of utilizing sensor data from two or more sensors to calibrate and/or validate a calibration of one or more of the sensors.

For example, the self-calibration systems and methods may include one or more sensors configured to capture image, video, or other sensor data of the environment. A computing device may then analyze the sensor data of the first and second sensors to determine the presence of one or more objects within the environment that corresponds to known objects in a database having known dimensions. The computing device may utilize these known objects to determine whether one or more of the sensors is correctly calibrated. Moreover, the computing device may utilize the sensor data captured with respect to the known object by the first sensor and project that sensor data into the sensor data of the second sensor to calibrate the second sensor.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   an electronic control unit configured to:
      obtain a first image comprising a first portion of an environment from a first image sensor;
      obtain a second image comprising a second portion of the environment from a second image sensor, wherein the first image and the second image contain an overlapping portion;
      obtain parameters of an identified object within the overlapping portion, the parameters include known dimensions of the identified object obtained from a database;
      determine a distance to the identified object in the environment based on a depth signal from a depth sensor;
      scale the known dimensions of the identified object based on the distance to the identified object in the environment thereby generating scaled parameters of the identified object,
      determine a miscalibration of the first image sensor or the second image sensor based on a comparison of the identified object in the overlapping portion and the parameters of the identified object;
      in response to determining the miscalibration of the first image sensor, calibrate the first image sensor based on the scaled parameters of the identified object and the second image;
      in response to determining the miscalibration of the second image sensor, calibrate the second image sensor based on the scaled parameters of the identified object and the first image; and
      synthesize an image of the identified object based on the parameters of the identified object obtained from the database, and wherein calibration of the first image sensor or the second image sensor is based on the synthesized image of the identified object.

2. The system of claim 1, wherein the depth sensor is at least one of a radar sensor, a sonar sensor, or a LIDAR sensor.

3. The system of claim 1, wherein the first image is a frame from a video feed captured by the first image sensor.

4. The system of claim 1, wherein the identified object is a vehicle and an identity of the identified object is defined by at least one of a make, model, or year of the vehicle.

5. The system of claim 1, wherein the parameters of the identified object comprise at least one of a height, width, or depth dimension of the identified object.

6. The system of claim 1, wherein the parameters of the identified object include a color of the identified object such that calibration of the first image sensor or the second image sensor includes a color calibration.

7. A method comprising:
   obtaining, with an electronic control unit, a first image comprising a first portion of an environment from a first image sensor;
   obtaining, with the electronic control unit, a second image comprising a second portion of the environment from a second image sensor, wherein the first image and the second image contain an overlapping portion of the environment;
   determining an identity of an object present within the overlapping portion;
   obtaining parameters of the identified object, the parameters include known dimensions of the identified object obtained from a database;
   determining a distance to the identified object in the environment based on a depth signal from a depth sensor;
   scaling the known dimensions of the identified object based on the distance to the identified object in the environment thereby generating scaled parameters of the identified object;
   determining a miscalibration of the first image sensor or the second image sensor based on a comparison of the identified object in the overlapping portion and the parameters of the identified object;
   in response to determining the miscalibration of the first image sensor, calibrating the first image sensor based on the scaled parameters of the identified object and the second image;
   in response to determining the miscalibration of the second image sensor, calibrating the second image sensor based on the scaled parameters of the identified object and the first image and
   synthesizing an image of the identified object based on the parameters of the identified object obtained from the database, and calibrating the first image sensor or the second image sensor based on the synthesized image of the identified object.

8. The method of claim 7, wherein the depth sensor is at least one of a radar sensor, a sonar sensor, or a LIDAR sensor.

9. The method of claim 7, wherein the first image is a frame from a video feed captured by the first image sensor.

10. The method of claim 7, wherein the object is a vehicle and the identity of the object comprises at least one of a make, model, or year of the vehicle.

11. The method of claim 7, wherein the parameters of the object comprise at least one of a height, width, or depth dimension of the object.

12. The method of claim 7, wherein the parameters of the object include a color of the object such that calibration of the first image sensor or the second image sensor includes a color calibration.

13. A system comprising:
an electronic control unit configured to:
- obtain a first image comprising a first portion of an environment from a first image sensor;
- determine an identity of an object present within the first image;
- obtain parameters of the identified object, the parameters include known dimensions of the identified object obtained from a database;
- receive a depth signal corresponding to a distance from a depth sensor to the identified object;
- determine a scaling factor to apply to the parameters of the identified object based on the depth signal;
- scale the known dimensions of the identified object based on the scaling factor thereby generating scaled parameters of the identified object;
- determine a miscalibration of the first image sensor based on a comparison of the identified object in the first image and the scaled parameters of the identified object; and
- in response to determining the miscalibration of the first image sensor, calibrate the first image sensor based on the scaled parameters of the identified object; and
- synthesize an image of the identified object based on the parameters of the identified object obtained from the database, and wherein calibration of the first image sensor is based on the synthesized image of the identified object.

14. The system of claim 13, wherein the depth sensor is at least one of a radar sensor, a sonar sensor, or a LIDAR sensor.

15. The system of claim 13, wherein the parameters of the object include a color of the object such that calibration of the first image sensor includes a color calibration.

* * * * *